United States Patent [19]

Thompson et al.

[11] 4,452,175
[45] Jun. 5, 1984

[54] POST ASSEMBLY FOR A PARLOR STALL

[75] Inventors: Duncan M. Thompson, Warrenville; Harold V. Swanson, Downers Grove, both of Ill.

[73] Assignee: Babson Bros. Co., Oakbrook, Ill.

[21] Appl. No.: 87,979

[22] Filed: Oct. 25, 1979

[51] Int. Cl.³ .............................................. A01K 1/12
[52] U.S. Cl. .................................... 119/14.03; 119/27
[58] Field of Search ................... 119/14.03, 27, 28, 15, 119/16, 147

[56] References Cited

U.S. PATENT DOCUMENTS

| | | | |
|---|---|---|---|
| 1,043,293 | 11/1912 | Boyce | 119/15 |
| 2,547,426 | 4/1951 | Youngman | 119/27 |
| 3,059,616 | 10/1962 | Cline | 119/14.03 |
| 3,828,733 | 8/1974 | Correia | 119/14.03 |

OTHER PUBLICATIONS

Bou-Matic Sketch Submitted in Applicants' Prior Art Statement.

Primary Examiner—Hugh R. Chamblee
Attorney, Agent, or Firm—Wood, Dalton, Phillips, Mason & Rowe

[57] ABSTRACT

A stall for a milking parlor having an elevated cow platform with an operator's floor along one side. The stall has a series of post assemblies to which longitudinal elements are secured. Each of the intermediate post assemblies has a pair of posts secured to the platform on the side remote from the operator's floor. A cantilever member has an arched portion extending from the laterally spaced posts across the cow platform to the side adjacent the operator's floor. A post portion extends downwardly with its lower end spaced above the cow platform affording the operator ready access to the cows.

1 Claim, 4 Drawing Figures

POST ASSEMBLY FOR A PARLOR STALL

This invention relates to a stall for a milking parlor.

In a typical milking parlor, an elevated cow platform has an operator's floor located along one side. The operator may move along the side of the platform to attend to the cows. A stall structure on the cow platform has posts along each side to which are secured longitudinal elements that restrain the cows and carry some of the milking apparatus. Posts located along the edge of the platform adjacent the operator's floor restrict the operator's activities and obstruct visual observation of the cows and milkers. If the operator is not careful, a restless cow may force an arm against a post and could cause a serious injury.

This invention is concerned with an improved post structure for a milking parlor stall in which the posts along the edge of the cow platform adjacent the operator's floor are cantilever supported from above and do not extend down to the cow platform.

More particularly, one feature of the invention is the provision of a stall post assembly which includes a pair of laterally spaced posts secured to the cow platform on the side which is remote from the operator's floor and a cantilever member which has an arch portion extending from the two laterally spaced posts across the cow platform with a post portion extending downwardly and having a lower end spaced above the cow platform.

Another feature is that the lower end of the outermost of the two laterally spaced posts is firmly secured to the cow platform, as by an anchor strip embedded in the concrete platform surface, to support the weight of the cantilever member.

Further features and advantages of the invention will readily be apparent from the following specification and from the drawings, in which.

Figure 1:
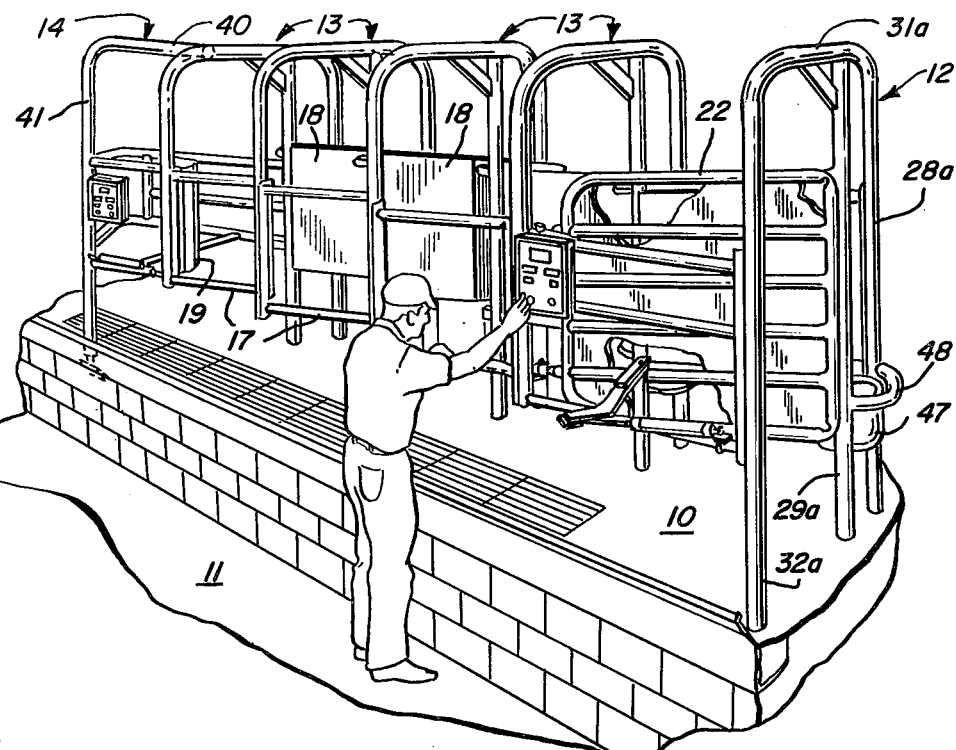
FIG. 1 is a perspective view of a portion of the milking parlor illustrating a stall incorporating the invention.
Figure 2:
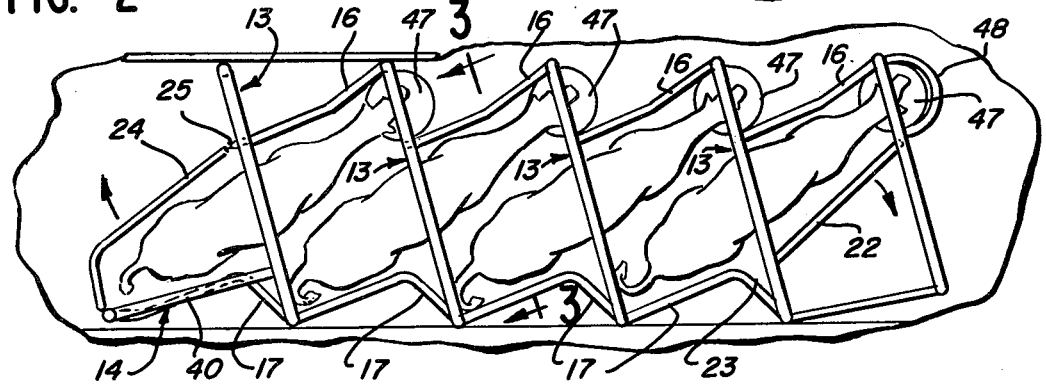
FIG. 2 is a plan view of the stall of FIG. 1 showing the position of the cows therein.

FIGS. 1 and 2 illustrate the invention as incorporated in a herringbone stall generally used for four or more cows, which has a cow platform 10 extending along and above an operator's floor 11. The stall has a front post assembly 12, a plurality of intermediate post assemblies 13 and a rear post assembly 14. The post assemblies are spaced along the length of the cow platform 10 and are joined by inner and outer longitudinal members 16, 17 respectively. The longitudinal stall members position the cows during the milking operation as illustrated in FIG. 2. Shield plates 18, 19 are preferably provided on the longitudinal stall members. A front gate 22 is pivoted to outer longitudinal stall member 17 at 23 and may be opened to release the cows from the stall. Rear gate 24 is pivoted to intermediate post assembly 13 at 25 and may be opened to admit a group of cows to the stall.

Figure 3:
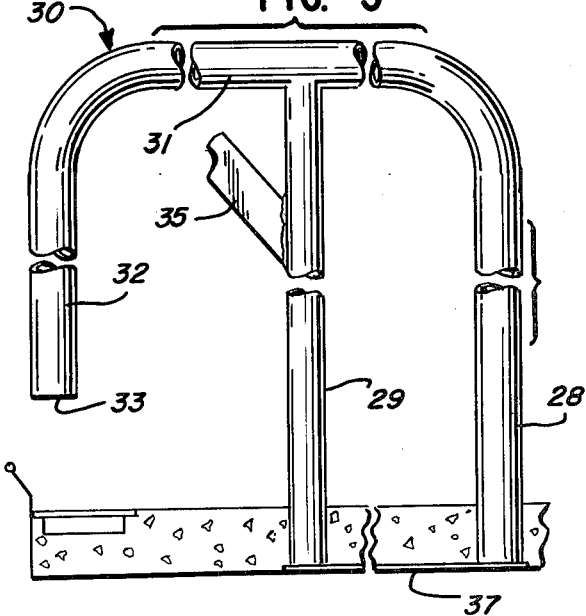
FIG. 3 is an enlarged broken elevation of an intermediate stall post assembly taken generally along line 3—3 of FIG. 2.

The intermediate post assembly is best seen in FIG. 3. A pair of laterally spaced posts 28, 29 are provided at the side of the cow platform remote from operator's floor 11. The intermediate post assembly extends generally transversely of the cow platform 10. A cantilever member 30 has an arched portion 31 which extends from the posts 28, 29 toward the operator's floor 11. A post portion 32 extends downwardly from the arch portion 31 and has a lower end 33 spaced above the cow platform. A diagonal brace 35 extends across the joint between the upper end of post 29 and the arch portion 31 of the cantilever member, strengthening the assembly.

The lower end of the downwardly extending post portion of each of the intermediate stall post assemblies is spaced above the cow platform a distance of the order of 25 inches. The longitudinal stall members 17 are above the lower ends of the post portions 32. Accordingly, the entire length of the stall adjacent the operator's floor is open for access by the operator to the cows and milking equipment and for visual observation of all portions of the milking area regardless of the position of the operator along the stall. The post portion 33 is adjacent the cow's hind quarters. Elimination of the lower part of the post enables the operator to apply and remove milkers, inspect, wash and treat the cows without interference. The possibility of injury to the operator or to the cows from the rear stall post is minimized.

The surface of the cow platform 10 is typically of poured concrete. The lower ends of the laterally spaced posts 28, 29 are embedded in the concrete and are firmly anchored by virtue of a strap 37 welded between the lower ends of the posts and covered by the concrete platform surface. Strap 37 maintains the appropriate spacing between the ends of posts 28, 29 during assembly of the stall and strengthens the cantilever structure by resisting any tendency of the lower end of post 28 to loosen in the concrete.

Figure 4:
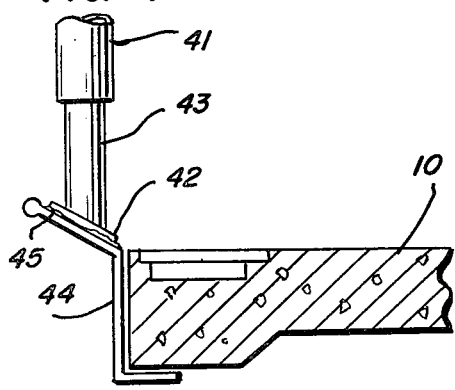
FIG. 4 is an enlarged fragmentary view of an anchor for the post at the rear end of the parlor stall.

At each end of the stall the posts along the operator floor edge of the cow platform extend to the platform to provide stability. The front stall post assembly 12 has laterally spaced posts 28a, 29a which may be identical with the posts 28, 29 of the intermediate post assemblies 13. Arch portion 31a extends across the cow platform. Post 32a is longer than the post portions 32 of the intermediate stall assemblies, extending down into the cow platform floor 10. The post 32a is out of the milking area and does not interfere with the operator's handling of the cows and milking equipment. Rear stall post assembly 14 has an arch portion 40 which extends generally longitudinally of the cow platform from the arch portion 31 of the post assembly 13 immediately forward of the rear of the stall. Rear post 41 extends downwardly from arch member 40 at a position adjacent the rear of the last stall position and is anchored to the cow platform 10. As best seen in FIG. 4, an anchor plate 42 is secured to the bottom of stub shaft 43 telescoped in post 41 so that it may be vertically adjusted in position. In the form of stall illustrated in the drawing, cow platform 10 has a steel curb 44 along the outer edge with a flange 45 which extends upwardly and outwardly at an angle of the order of 45°. Anchor plate 42 has a similar angle and is welded to the curb flange. If a poured concrete curb is used in place of steel curb 44, the rear post anchor is adjusted downwardly and anchor plate 42 is embedded in the concrete.

Feed bowls 47 are mounted between the two laterally spaced posts 28, 29 and 28a, 29a for each stall position. A guard rail 48 is provided immediately above and extending around the feed bowl 47 at the forward stall to protect it from cows as they exit from the parlor when front gate 22 is open.

The stall posts are preferably of galvanized steel and all of the joints are welded. A three inch pipe with a wall thickness of 0.20 inch has been found to provide a cantilever structure of sufficient strength to construct a herringbone stall of any desired length. The illustrated construction will contain the cows during milking and will withstand any normal lateral forces due to crowding of the cows. It is not necessary to provide additional support from the walls or ceiling of the building in which the stall is located.

We claim:

1. In a stall for a milking parlor having an elevated cow platform with an operator's floor extending along one side thereof and a curb having a flange extending outwardly at an angle on the order of 45° on the one platform side, said stall having longitudinal elements on each side of said platform to restrain the cows during milking, the improvement comprising:

a plurality of improved stall post assemblies to which said longitudinal elements are secured, each assembly having
 a pair of laterally spaced posts secured to said platform on the side thereof remote from said operator's floor, and
 a cantilever member having an arch portion extending from said laterally spaced posts across said cow platform to the side thereof adjacent said operator's floor, and a post portion extending downwardly and having a lower end spaced above the cow platform;

front and rear post assemblies at opposite ends of the parlor stall, with the lower ends of the post portion of each of the front and rear post assemblies adjacent the operator's floor secured to said platform; and anchor plates on the post portion of each assembly secured to said cow platform adjacent the operator's floor, said plates lying in a plane at an angle on the order of 45° to the surface of said cow platform and secured to the platform curb.

* * * * *